United States Patent
Chen

(10) Patent No.: US 8,970,430 B2
(45) Date of Patent: Mar. 3, 2015

(54) AUXILIARY POSITIONING METHOD AND AUXILIARY POSITIONING DEVICE USING THE METHOD

(75) Inventor: Shih Hao Chen, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 714 days.

(21) Appl. No.: 12/633,100

(22) Filed: Dec. 8, 2009

(65) Prior Publication Data

US 2010/0156708 A1 Jun. 24, 2010

(30) Foreign Application Priority Data

Dec. 24, 2008 (TW) .............................. 97150480 A

(51) Int. Cl.
*G01S 19/48* (2010.01)
*G01S 5/12* (2006.01)
(52) U.S. Cl.
CPC .. *G01S 19/48* (2013.01); *G01S 5/12* (2013.01)
USPC ..................... 342/357.31; 342/464
(58) Field of Classification Search
CPC ... G01S 5/0252; G01S 5/0257; G01S 5/0263; G01S 19/48
USPC ..................... 342/451, 457, 357, 31
See application file for complete search history.

(56) References Cited

U.S. PATENT DOCUMENTS

| | | | | |
|---|---|---|---|---|
| 5,481,588 A | * | 1/1996 | Rickli et al. ............... | 379/32.01 |
| 5,564,079 A | * | 10/1996 | Olsson ...................... | 455/456.3 |
| 5,936,572 A | * | 8/1999 | Loomis et al. ............ | 342/357.29 |
| 5,999,126 A | * | 12/1999 | Ito ............................. | 342/357.25 |
| 6,104,344 A | * | 8/2000 | Wax et al. ..................... | 342/378 |
| 6,140,964 A | * | 10/2000 | Sugiura et al. ................ | 342/464 |
| 6,249,252 B1 | * | 6/2001 | Dupray ......................... | 342/450 |
| 6,269,246 B1 | * | 7/2001 | Rao et al. .................. | 455/456.3 |
| 6,393,294 B1 | * | 5/2002 | Perez-Breva et al. ...... | 455/456.5 |
| 6,570,529 B2 | * | 5/2003 | Richton et al. ............ | 342/357.29 |
| 6,919,842 B2 | * | 7/2005 | Cho ........................... | 342/357.31 |
| 7,228,136 B2 | * | 6/2007 | Myllymaki et al. ........ | 455/456.1 |
| 7,298,328 B2 | * | 11/2007 | Wang et al. .................... | 342/451 |
| 2005/0075118 A1 | * | 4/2005 | Lewis et al. ................ | 455/456.5 |
| 2008/0291086 A1 | * | 11/2008 | Walley et al. ................. | 342/367 |
| 2010/0097269 A1 | * | 4/2010 | Loidl et al. ..................... | 342/378 |
| 2010/0317390 A1 | * | 12/2010 | Rekimoto ..................... | 455/511 |

* cited by examiner

*Primary Examiner* — Gregory C Issing

(74) *Attorney, Agent, or Firm* — Edell, Shapiro & Finnan, LLC

(57) ABSTRACT

An auxiliary positioning method, applied to a portable electronic device operative in a wireless communication network system and a satellite positioning system, for determining current position information of the potable electronic device, includes steps of receiving a plurality of current signals from at least one base station in the wireless communication network system to generate current signal information; accessing at least one track record related to the current signal information from a track record database, wherein the track record database includes a plurality of track records which record respective position information and signal information of base stations corresponding to the position information; and calculating the current position information according to the at least one track record.

15 Claims, 6 Drawing Sheets

AUXILIARY POSITIONING METHOD AND AUXILIARY POSITIONING DEVICE USING THE METHOD

CROSS REFERENCE TO RELATED PATENT APPLICATION

This patent application is based on Taiwan, R.O.C. patent application No. 97150480 filed on Dec. 24, 2008.

FIELD OF THE INVENTION

The present invention relates to an auxiliary positioning method and an auxiliary positioning device using the method, and more particularly, to an auxiliary positioning method and an auxiliary positioning device, applied to a portable device, implementing signals of a wireless communication network system and a satellite positioning system to determine auxiliary positioning information.

BACKGROUND OF THE INVENTION

Since the first satellite of the global positioning system (GPS) was orbited by the Unite States Department of Defense, the GPS has become a household word in the global navigation and positioning field and the satellite measurement field. As telecommunication and information technologies develop rapidly, and more particularly, as new Internet and wireless data communication technologies emerge, positioning and measurement applications of the GPS continue to evolve from long-time static measurements to real-time dynamic positioning.

The GPS was first employed to navigate planes or ships, and has since been increasingly used in the daily life of modern people. For example, GPS in combination with an e-map can be used for navigating a vehicle, so that a driver can arrive at a destination easily. The GPS is also used for leisure activities such as hiking and mountain climbing, and accordingly a hiker and a climber can more easily find a destination or route home. In sum, capabilities of the GPS have changed the daily life of many people However, the GPS is not able to function smoothly in all places. FIG. 1 shows a schematic diagram of an operation principle of a GPS 1. As clearly seen in FIG. 1, a mobile receiving device 10 such as a mobile phone or a personal digital assistant (PDA) receives a satellite signal 110 transmitted from a plurality of artificial satellites 11 orbiting around the earth 12. After receiving the satellite signals 110, the mobile receiving device 10 calculates a two dimensional coordinate position or a three dimensional coordinate position via triangulation. Therefore, a user obtains a current position of the user via the two or three dimensional coordinate position calculated by the mobile receiving device 10. It is apparent from the foregoing schematic diagram of the GPS that, when the mobile receiving device 10 does not receive the satellite signal 110 transmitted from the artificial satellites 11, the two or three dimensional coordinate position is not calculated successfully, such that the user cannot obtain the current position. The satellite signals 110 may not be received, for example, in an urban area having crowded skyscrapers or inside a building. That is, when the mobile receiving device 10 is used in an urban having crowded skyscrapers or inside a building, the mobile receiving device 10 may have low utilization efficiency or even be of no use at all.

Therefore, a wireless communication system, such as a Global System for Mobile communications (GSM), a General Packet Radio Service (GPRS) system or a Wideband Code Division Multiple Access (WCDMA), is employed to solve the problem of GPS failures in an urban area having crowded skyscrapers or inside the building. That is, according to the above wireless communication systems, a large number of mobile phone base stations distributed in various areas assist the mobile receiving device to perform positioning. FIG. 2 shows a schematic diagram of positioning a mobile receiving device 20 using a mobile phone base station system 2. When a user using the mobile receiving device 20 such as a mobile phone or a PDA enters an area where satellite signals transmitted from the GPS cannot be received, positioning of the mobile receiving device 20 is taken over by the mobile phone base station system 2 from the GPS. The mobile phone base station system 2 comprises various base station networks A to G in a honeycomb arrangement to cover different areas respectively. A conventional positioning method using the mobile phone base station system 2 is described below. When the mobile receiving device 20 is in an area covered by the base station network A, in addition to receiving a wireless signal of the base station network A, the mobile receiving device 20 simultaneously receives wireless signals of the base station networks B to G. The mobile receiving device 20 transmits strength information of the different wireless signals from the base station networks A to G back to a system server 200 via the mobile phone base station system 2. The system server 200 then calculates current position information of the mobile receiving device 20 according to the strength information of the different wireless signals from the mobile receiving device 20. The system server 200 further transmits the current position information to the mobile receiving device 20, and accordingly the mobile receiving device 20 can perform positioning according to the current position information. Under such structure, the mobile receiving device 20 is enabled to perform positioning in the area having crowded skyscrapers or inside the building where the satellite signals cannot be received.

The technology of using the mobile phone base station system 2 for positioning overcomes the problem of the GPS failures in the urban area having crowded skyscrapers or inside the building. However, it would be desirable if the positioning accuracy were further improved. For example, a positioning accuracy of only about 100 meters is rendered according to the positioning method of using the mobile phone base station system 2. In addition, when the mobile phone base station system 2 is used for positioning, the mobile receiving device 20 at a user end needs to transmit the strength information of the different wireless signals received back to the system server 200, which then transmits the calculated position information back to the mobile receiving device 20 at the user end. However, when the system server 200 at a service provider end does not offer the position information calculation, the mobile receiving device, such as a mobile phone or a PDA at the user end, although having a positioning function, is of no use. Therefore, one main object of the present invention is to overcome the disadvantages incurred when the mobile phone base station system 2 is used for positioning a mobile receiving device.

SUMMARY OF THE INVENTION

The present invention relates to an auxiliary positioning method and an auxiliary positioning device using the method. The auxiliary positioning method and the auxiliary positioning device, applied to a portable electronic device, implement signals of a wireless communication network system and a satellite positioning system to determine auxiliary positioning information. According to the present invention, a disadvantage of GPS failures inside a building is overcome.

An auxiliary positioning method, applied to a portable electronic device operative in a wireless communication network system and a satellite positioning system, for determining current position information of the potable electronic device, comprises steps of receiving a plurality of current signals from at least one base station in the wireless communication network system to generate current signal information; accessing at least one track record related to the current signal information from a track record database, wherein the track record database includes a plurality of track records which record respective position information and signal information of base stations corresponding to the position information; and calculating the current position information according to the at least one track record.

An auxiliary positioning method, applied to a portable electronic device operative in a wireless communication network system and a satellite positioning system, for determining current position information of the potable electronic device, comprises steps of receiving signals from the satellite positioning system and calculating position information; receiving signals from a wireless communication network system and generating signal information; storing the position information and the signal information into a track record in a track record database; and calculating the current position information according to track records and current signals only when the portable device does not receive an effective signal of the satellite positioning system, wherein the current signals are transmitted by the wireless communication network system.

An auxiliary positioning device, applied to a portable electronic device operative in a wireless communication network system and a satellite positioning system, for determining current position information of the potable electronic device, comprises a signal processing module, for receiving satellite signals from the satellite positioning system and calculating position information, and receiving base station signals from at least one base station in the wireless communication network system and generating signal information; a track recording module, for storing the position information and the signal information into a track record in a track record database; and an auxiliary positioning module, coupled to the track recording module and the signal processing module, for calculating the current position information according to track records and current signals only when the portable device does not receive an effective signal of the satellite positioning system, wherein the current signals are transmitted by the wireless communication network system.

BRIEF DESCRIPTION OF THE DRAWINGS

The following description and figures are disclosed to gain a better understanding of the advantages of the present invention.

FIG. 3 (b) is a flowchart of an auxiliary positioning method according to an embodiment of the invention.

DETAILED DESCRIPTION OF THE PREFERRED EMBODIMENT

Figure 1:
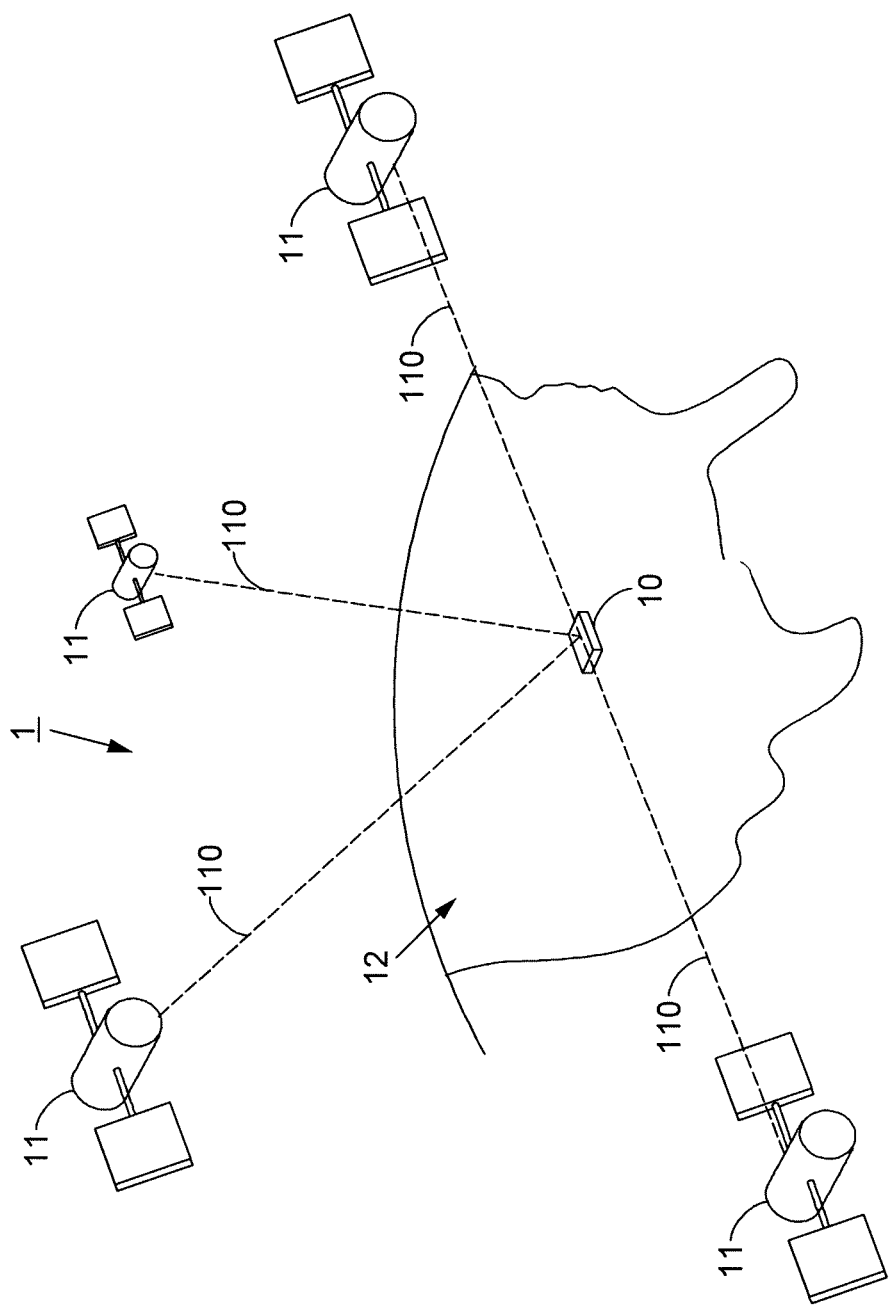
FIG. 1 is a schematic diagram of an operation principle of a GPS.
Figure 2:
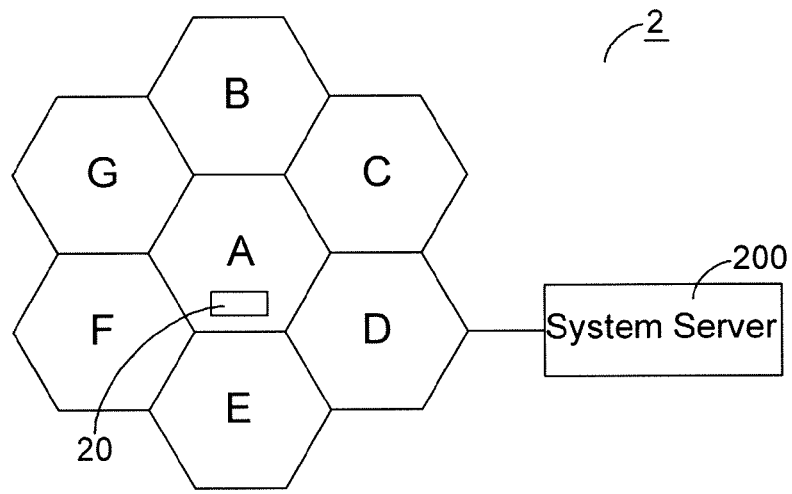
FIG. 2 is a schematic diagram of positioning a mobile receiving device 20 by applying a mobile phone base station system.

An auxiliary positioning method applied to a portable electronic device is provided according to the present invention. The auxiliary positioning method implements signals of a wireless communication network system shown in FIG. 2 and position information of a satellite positioning system shown in FIG. 1 to determine auxiliary positioning information. The auxiliary positioning method comprises steps of obtaining signal information of at least one base station of the wireless communication network system at a predetermined time; accessing a track record comprising a plurality of position-related records, which are signal information of related base stations of the wireless communication network system corresponding to position information of the satellite positioning system, respectively, of earlier than the predetermined time; and calculating the auxiliary position information according to the signal information of the at least one base station at the predetermined time and the track record. For illustrative purposes, the following description will describe the method according to the present invention in detail. The foregoing track record comprises position information, and the signal information of at least one base station corresponding to position information. The position information at least comprises one of a longitude data, a latitude data, an altitude data, a speed data and a direction data. In addition to signal strength, the signal information also comprises other types of information, such as a base station number and a frequency number, for identifying the base station by the portable electronic device.

Figure 3A:
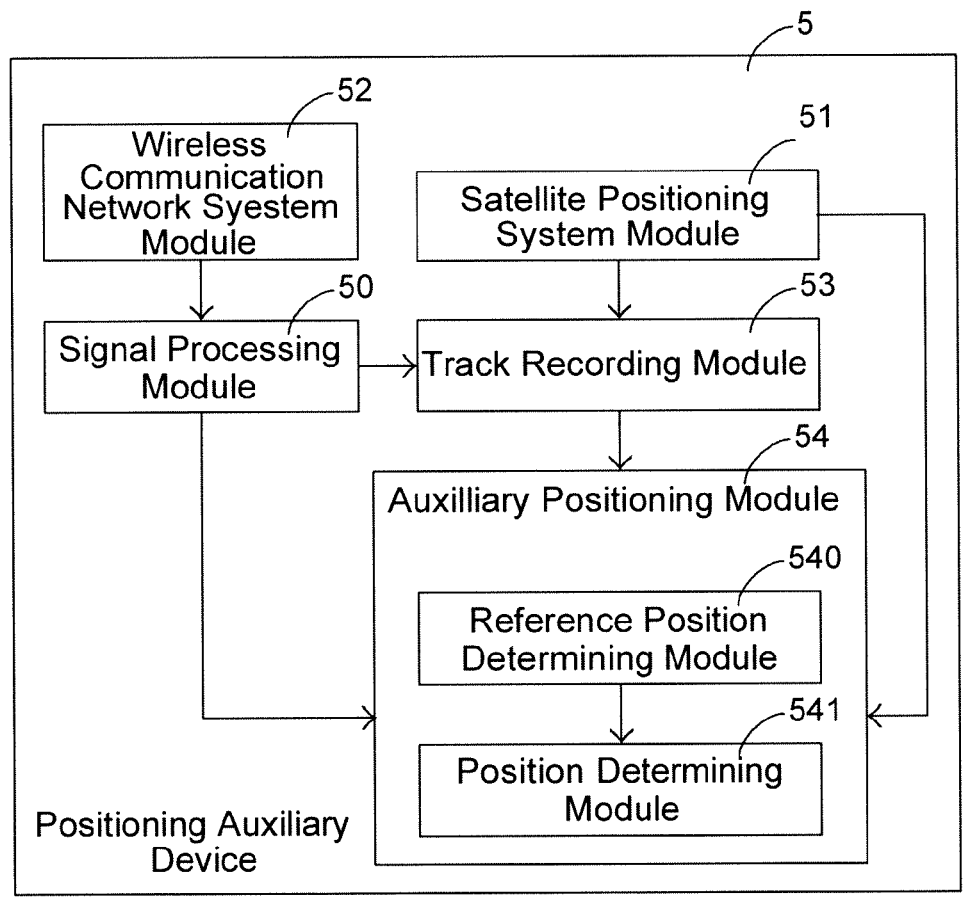
FIG. 3 (a) is a block diagram of an auxiliary positioning device according to an embodiment of the invention.
Figure 3B:
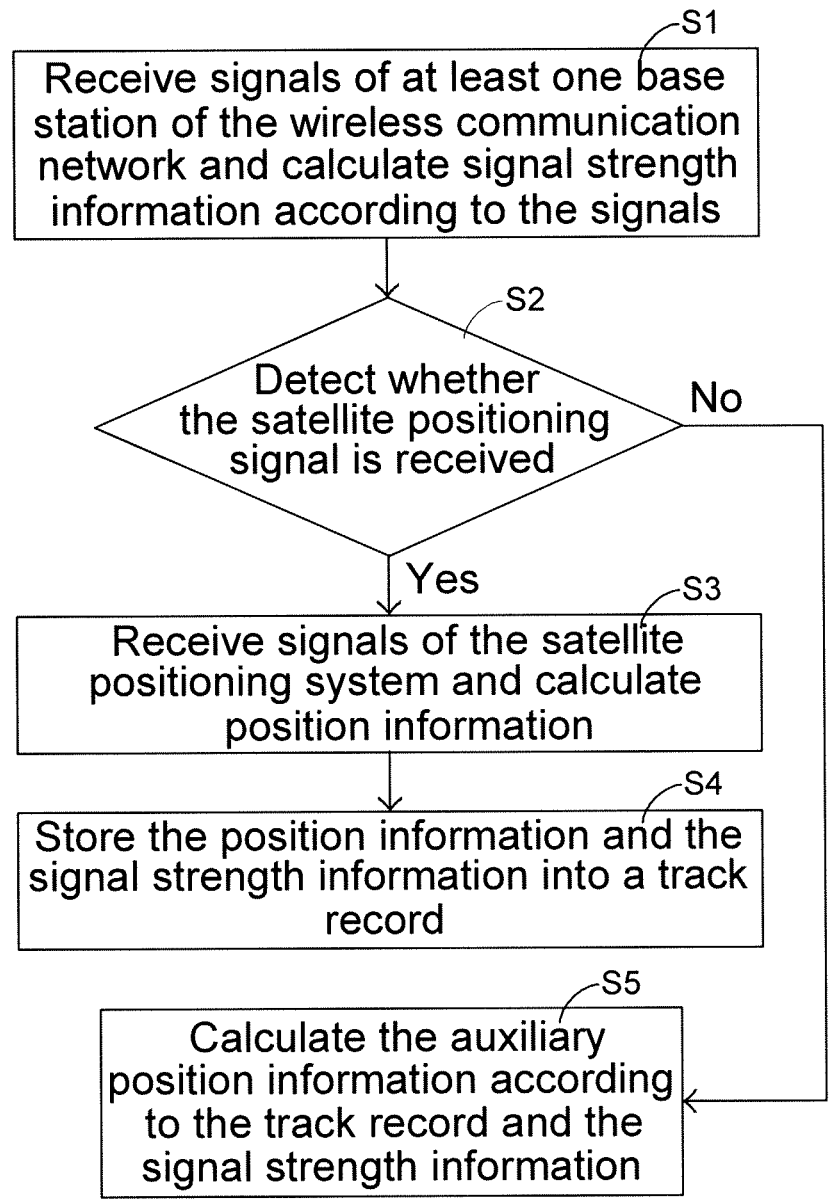

FIG. 3 (a) shows a block diagram of an auxiliary positioning device 5 according to one embodiment of the invention for overcoming disadvantages of a conventional positioning technology. The auxiliary positioning device 5 for executing the foregoing auxiliary positioning method is applied to a portable electronic device, which receives signals of a wireless communication network system and a satellite positioning system to determine auxiliary positioning information. The auxiliary positioning device 5 comprises a satellite positioning system module 51, a wireless communication network system module 52, a signal processing module 50, a track recording module 53, and an auxiliary positioning module 54. The satellite positioning system module 51 receives information of the satellite positioning system and calculates position information according to the received information. The wireless communication network system module 52 receives a signal of at least one base station of the wireless communication network and calculates signal information. The signal processing module 50 processes the signal information of the at least one base station received and transmitted by the wireless communication network system module 52. The track recording module 53, signally connected to the satellite positioning system module 51 and the wireless communication network system module 52, is used for storing a track record in a track record database and updates data corresponding to the position information and signal strength information at a predetermined time interval. The auxiliary positioning module 54, signally connected to the track recording module 53 and the wireless communication network system module 52, comprises a reference position determining module 540 and a position determining module 541. The reference position determining module 540 filters out at least one reference position according to signal information of at least one base station at a predetermined time and the track record, so as to determine the auxiliary positioning information. Therefore, when the signal of the satellite positioning system is not received but the signal of the at least one base station of the wireless communication network is received at the predetermined time, the reference position determining module 540 filters out at least one reference position. The position determining module 541 then calculates the auxiliary position information according to signal strength information and the at least one reference position at the predetermined time when the signal of the satellite positioning system is not received. Instead of being set inside the auxiliary positioning device 5, the foregoing satellite positioning system module 51 and the wireless communication network system module 52 can also be set outside a housing of the auxiliary positioning device 5. Optionally, other devices are used for providing the information of the satellite positioning system and the signal of the base station of the wireless communication network. In addition, signals between the devices and other modules of the auxiliary positioning device 5 are transmitted via a wire or wireless manner such as the Bluetooth technology.

FIG. 3 (*b*) is a flowchart of an auxiliary positioning method according to one embodiment of the invention. In this embodiment, the auxiliary positioning method according to the present invention is applied to a portable electronic device. Using the auxiliary positioning method, signals of a wireless communication network system and a satellite positioning system are received to determine auxiliary positioning information. As clearly seen in FIG. 3 (*b*), in Step S1, the portable electronic device receives signals of at least one base station of the wireless communication network, and calculates signal strength information according to the signal. In Step S2, the portable electronic device detects whether the satellite positioning signal is received. When the answer of Step S2 is yes, Step S3 is performed. In Step S3, the portable electronic device receives information of the satellite positioning system and calculates position information. In Step S4, the portable electronic device stores data corresponding to the position information and the signal strength information into a track record. When the answer of Step S2 is no, Step S5 is performed. In Step S5, the portable electronic device calculates the auxiliary position information according to the track record and the signal strength information.

From the above description, it is easily appreciated that, the main technical means of an auxiliary positioning method according to the present invention is that, when a portable electronic device enters an area where positioning information of the GPS cannot be received, the portable electronic device can nevertheless perform positioning via assistance of a wireless communication network system. The wireless communication network system may be a GSM system, wireless fidelity (WiFi) communication network, Worldwide Interoperability for Microwave Access (WIMAX) communication network or WCDMA system. The portable electronic device receives the signal strength information provided by the wireless communication network at different positions. Mainly according to the previously built track record and a relationship between the signal strength information and the positioning information provided by the satellite positioning system, the portable electronic device further calculates the auxiliary positioning information of an area having no satellite signals. Compared to the prior art, neither calculation by a host server of the wireless communication network system nor the calculated positioning information to be transmitted to the portable electronic device is needed according to the present invention. Consequently, the portable electronic device automatically calculates the position based on only the readily available information, and no additional information provided by the base station or the network system is needed. Moreover, the foregoing portable electronic device is a mobile phone, a PDA, a portable navigation device or a notebook computer, and the satellite positioning system is GPS system, global navigation satellite system (GLONASS) or Galileo satellite positioning system (GALILEO). The position information provided by the satellite positioning system at least comprises one of a longitude data, a latitude data, an altitude data, a speed data and a direction data. The method according to the present invention is further described in detail via different calculation approaches of the portable electronic device.

Figure 4:
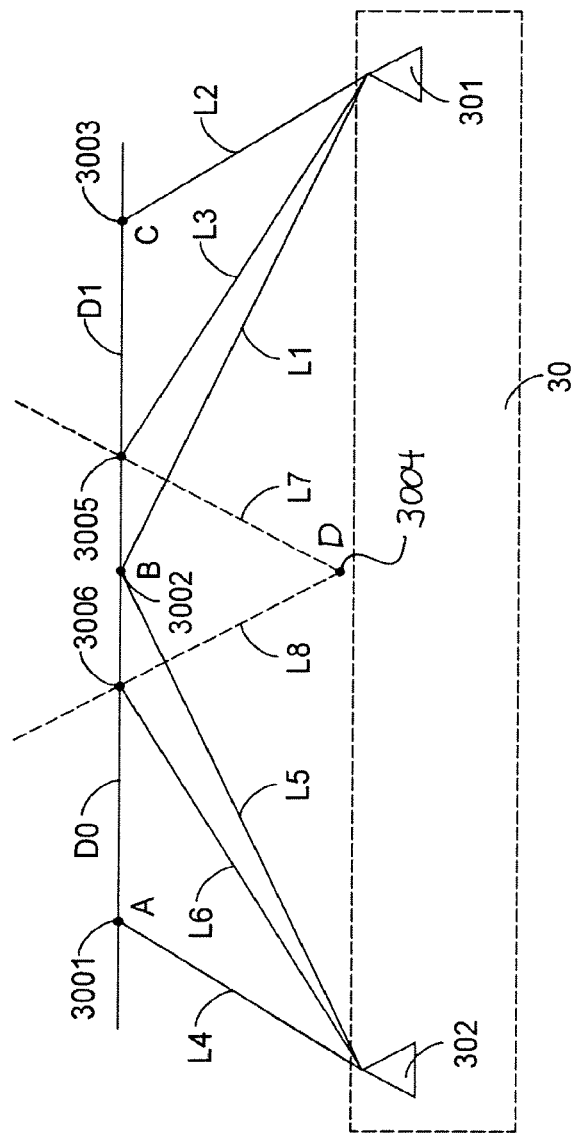
FIGS. 4 (a) and 4 (b) are schematic diagrams of a first calculation approach of an auxiliary positioning method according to the invention.
Figure 4B:
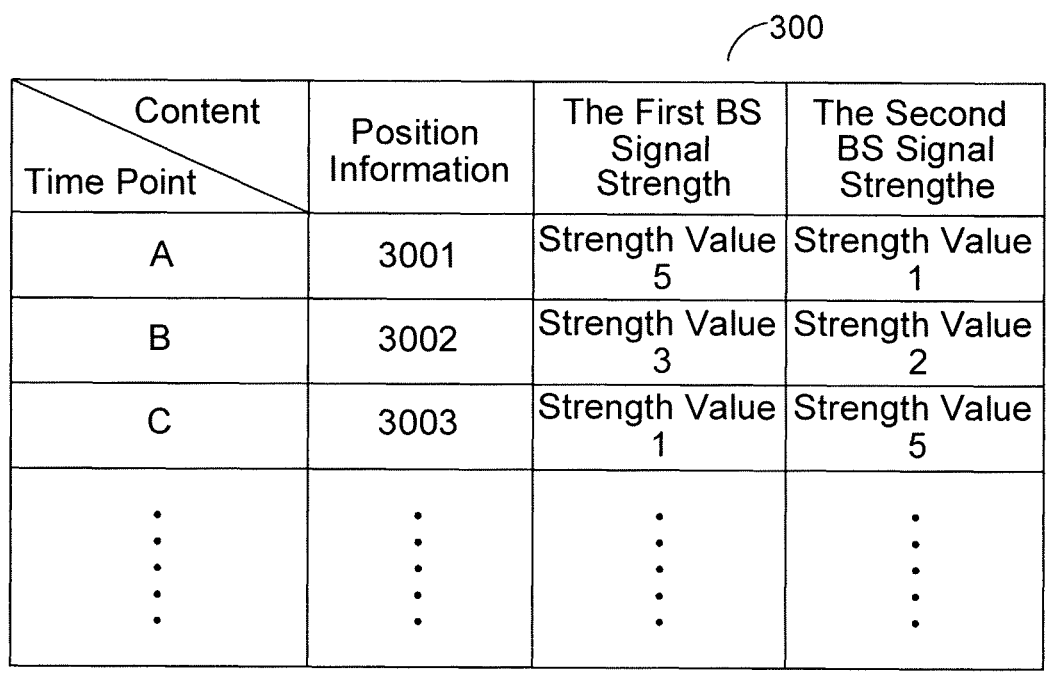

FIGS. 4 (*a*) and (*b*) are schematic diagrams of a first calculation approach of an auxiliary positioning method according to one embodiment of the invention. In this embodiment, a GPS&GSM system 30 is used as an example. Referring to FIG. 4 (*a*), the portable electronic device receives satellite signals of the GPS system at three different time points A, B and C respectively, and calculates position information 3001, 3002 and 3003 according to the satellite signals. Wireless signals transmitted by the GSM system 30 and satellite signals transmitted by the GPS system are received smoothly at the three time points. Meanwhile, the portable electronic device stores the position information 3001, 3002 and 3003 and signal strength information corresponding to the position information 3001, 3002 and 3003 into a track record 300. In this embodiment, content of the track record 300 is illustrated in FIG. 4 (*b*). The portable electronic device stores the position information 3001 obtained from the GPS system at the time point A and the signal strength information corresponding to the first base station 301 and the second base station 302 in the GSM system 30 at the time point A. For example, the signal strength information is a signal strength value 5 corresponding to the first base station 301 and a signal strength value 1 corresponding to the second base station 302. The portable electronic device then stores position information 3002 obtained from the GPS system and the signal strength information corresponding to the first base station 301 and the second base station 302 in the GSM system 30 at the time point B. For example, the signal strength information is a signal strength value 3 corresponding to the first base station 301 and a signal strength value 2 corresponding to the second base station 302. Similarly, the portable electronic device also stores position information 3003 and signal strength information at the time point C. For example, the signal strength information is the signal strength value 1 corresponding to the first base station 301 and the signal strength value 5 corresponding to the second base station 302. In addition to the position information and the signal strength information of the time points A, B and C, the track record 300 further records position information and signal strength information of other time points. Moreover, in the area, the signals transmitted by the first base station 301 and the second base station 302 are the highest signals the portable electronic device received. The foregoing example is disclosed for explanation convenience, and it is not a limitation to the invention. The abovementioned track record further comprises position information and signal information of a plurality of related base stations corresponding to the plurality of position information. The related base stations can be at least one base station of the wireless communication network system, and the portable electronic device is capable of receiving a signal of the at least one base station. The position information at least comprises one of a longitude data, a latitude data, an altitude data, a speed data and a direction data. In addition to the signal strength, the signal information further comprises information such as a base station number or a frequency number, and is provided to the portable electronic device to obtain identity information of the base station.

For example, when the portable electronic device inside a building cannot receive a satellite signal transmitted by the GPS system at a time point D, the portable electronic device meanwhile can only obtain signal strength information, such as a signal strength value 2 of the received signal from the first base station 301 and a signal strength value 4 of the received signal from the second base station 302, corresponds to the base stations in the GSM system 30. At time point D, the portable electronic device calculates the position according to the signal strength information corresponding to the first base station 301 and the second base station 302 at time point D and the track record 300. Such calculation approach is discussed below.

Considering the first base station, the signal strength value 2 at the time point D is between the signal strength values of the position information 3002 and 3003. Therefore, the position information 3002 and 3003 is used for calculating the position at time point D. According to the distance L1 from the position 3002 to the first base station 301, the distance L2 from the position 3003 to the first base station 301 and the signal strength information of the first base station 301 at the time point D, the estimated distance L3 is calculated based on a principle that the signal strength is inversely proportional to the square of the distance. The first reference position 3005 is defined by an intersection point of an arc of a circle with a radius L3 and a segment D1 between two end points corresponding to the positions 3002 and 3003. In addition, considering the second base station, the signal strength value 4 at the time point D is between the signal strength values of the position information 3001 and 3002. Therefore, the position information 3001 and 3002 is used for calculating the position at time point D. According to the distance L4 from the position 3001 to the second base station, the distance L5 from the position 3002 to the second base station, and the signal strength information of the second base station at the time point D, the estimated distance L6 is calculated based on a principle that the signal strength is inversely proportional to the square of the distance. The second reference position 3006 is defined by an intersection point of an arc of a circle with a radius L6 and a segment DO between two end points corresponding to the positions 3001 and 3002. Then, the first tangent L7 and the second tangent L8 are further calculated, respectively, according to the first reference position 3005 and L3, and the second reference position 3006 and L6. Moreover, the angle between L7 and L3 is 90 degrees, and the angel between L8 and L6 is 90 degrees. Finally, the position information 3004 at the time point D is obtained according to an intersection point of the first tangent L7 and the second tangent L8.

Figure 5:
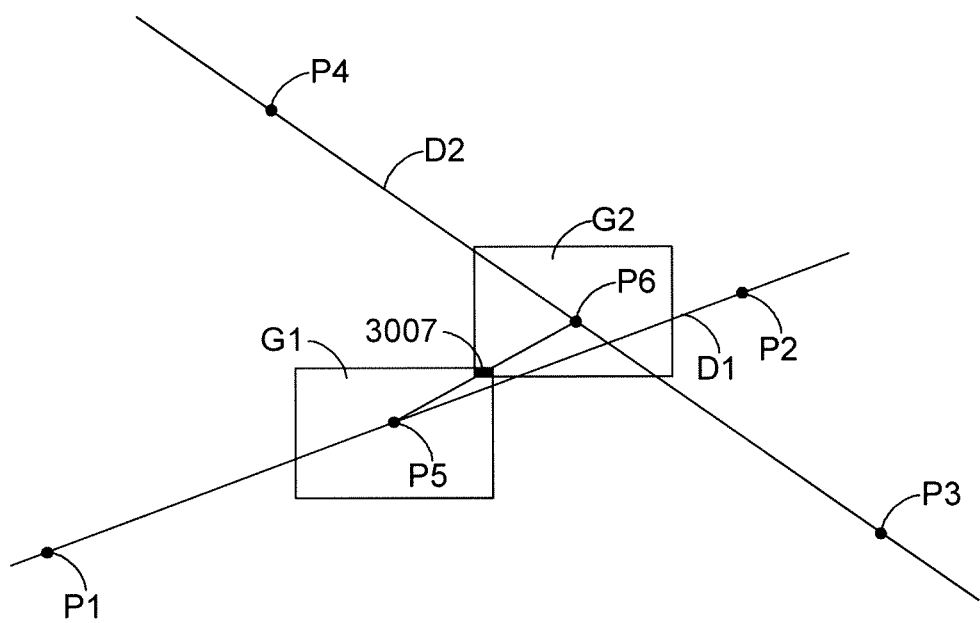
FIG. 5 is a second diagram of a second calculation approach of an auxiliary positioning method according to an embodiment of the invention.

FIG. 5 is a schematic diagram of a second calculation approach of an auxiliary positioning method according to the invention for overcoming disadvantages of a conventional positioning technology. Some of the same reference numerals used in FIG. 4 (a) and FIG. 4 (b) are relied upon to disclose an embodiment of the second calculation approach. When the portable electronic device at a time point E cannot receive the satellite signals of the GPS system, the portable electronic device calculates the position at time point E according to the signal strength information corresponding to the base stations in the GSM system obtained at the time point E and the foregoing track record 300. For example, the signal strength information is the signal strength value 2 of the first base station 301 and the signal strength value 4 of the second base station 302 at time point E. The calculation approach is illustrated in FIG. 5. Comparing the signal strength value 2 of the first base station 301 at the time point E with all of the signal strength values of the first base station 301 in the track record 300, the reference points P1 and P2 having similar signal strength values with the signal strength value 2 of the first base station 301 are found. Comparing the signal strength value 4 of the second base station 302 at the time point E with all of the signal strength values of the second base station 302 in the track record 300, the reference points P3 and P4 having similar signal strength values with the signal strength value 4 of the second base station 302 are found. The reference point P5 is a midpoint of a segment D1 between the reference points P1 and P2, and the reference point P6 is a midpoint of a segment D2 between the reference points P3 and P4. The reference position distribution information G1 and the reference position distribution information G2 are further calculated according to the reference points P5 and P6. As shown in FIG. 5, two rectangular ranges are formed by outwardly extending around centers of the reference point P5 and P6 respectively. The position information 3007 at time point E is calculated from the overlapped area of the reference position distribution information G1 and the reference position distribution information G2. Optionally, the position information 3007 at the time point E is directly determined according to a midpoint of a link of the reference point P5 and the reference point P6.

In addition, in the foregoing embodiments of the first and the second calculation approaches, a signal of at least one base station is received at the time point D. When a completely same record is not found in the track record, a proximate record can be used. Positions recorded in the proximate record are chosen as reference points. For example, signals of the first, second and third base stations are received at the time point D. However, the track record only records that signals of the first, the second and the fourth base station are received at a time point F and signals of the first, the third and the fourth base station are received at the time point G. Thus, the time point F and G are chosen as two reference points to perform subsequent calculation.

In conclusion, it shall clearly be understood that, a portable electronic device receives wireless signals transmitted by a wireless communication network and positioning signals transmitted by a satellite positioning system, and stores signal information and position information to build a track record of signal information and position information that the portable electronic device stores at different time points. When a user enters an area where signals of the GPS cannot be received, the portable electronic device still receives signals of a wireless communication network and is able to calculate accurate position information of the area according to a previously built track record. Therefore, the disadvantages of the conventional positioning technology are overcome and the main object of the present invention is achieved according to the auxiliary positioning method of the present invention.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An auxiliary positioning method, applied to a portable electronic device operative in a wireless communication network system and a satellite positioning system, for determining a current position information of the portable electronic device when the portable device can no longer determine position information from the satellite positioning system, the auxiliary positioning method comprising steps of:
   generating current signal information from at least two base stations with the strongest two signal strengths as received at the portable electronic device, wherein the current signal information includes base station numbers and respective signal strength of the at least two base stations;
   obtaining a plurality of track records including the at least two base stations by searching a track record database according to the current signal information, wherein the track record database includes a plurality of track records, and each of the track records includes previous signal information and reference position information determined from the satellite positioning system; and
   calculating the current position information according to the track records,
   wherein calculating the current position information comprises:
   establishing a first reference position defined by an intersection point of an arc of a first circle having a first radius and a first line segment passing through a first known position and a second known position of the portable electronic device with respect to a first one of the at least two base stations;
   establishing a second reference position defined by an intersection point of an arc of a second circle having a second radius and a second line segment passing through the second known position and a third known position of the portable electronic device with respect to a second one of the at least two base stations; and
   determining the current position based on an intersection between (1) a first tangent line tangent to the first circle and passing through the first reference position and (2) a second tangent line tangent to the second circle and passing through the second reference position.

2. The auxiliary positioning method as claimed in claim 1, wherein the satellite positioning system is one of Global Positioning System (GPS), GLObal NAvigation Satellite System (GLONASS) and Galileo satellite positioning system (GALILEO).

3. The auxiliary positioning method as claimed in claim 1, wherein the position information at least comprises one of a longitude data, a latitude data, an altitude data, a speed data and a direction data.

4. The auxiliary positioning method as claimed in claim 1, wherein the wireless communication network system is one of Global System for Mobile communications (GSM), wireless fidelity (WiFi) communication network, Worldwide Interoperability for Microwave Access (WiMAX) communication network and a digital television (DTV) system.

5. The auxiliary positioning method as claimed in claim 1, wherein the portable electronic device is one of a personal navigation device (PND), a mobile phone and a portable computer.

6. An auxiliary positioning method, applied to a portable electronic device operative in a wireless communication network system and a satellite positioning system, for determining current position information of the portable electronic device, the auxiliary positioning method comprising steps of:
   receiving signals from the satellite positioning system and calculating position information;
   receiving signals from a wireless communication network system and generating signal information;
   storing the position information and the signal information into a track record in a track record database; and
   calculating the current position information according to a plurality of track records and current signal information when the portable device can no longer determine position information from the satellite positioning system, wherein the current signals are transmitted by the wireless communication network system,
   wherein calculating the current position information comprises:
   establishing a first reference position defined by an intersection point of an arc of a first circle having a first radius and a first line segment passing through a first known position and a second known position of the portable electronic device with respect to a first one of the at least two base stations;
   establishing a second reference position defined by an intersection point of an arc of a second circle having a second radius and a second line segment passing through the second known position and a third known position of the portable electronic device with respect to a second one of the at least two base stations; and
   determining the current position based on an intersection between (1) a first tangent line tangent to the first circle and passing through the first reference position and (2) a second tangent line tangent to the second circle and passing through the second reference position.

7. The auxiliary positioning method as claimed in claim 6, wherein each of the track records includes previous signal information and reference position information.

8. The auxiliary positioning method as claimed in claim 6, wherein the step of calculating the current position information according to the track records and the current signal information further comprises:
   generating the current signal information from at least two base stations with the strongest two signal strengths as received at the portable electronic device, wherein the current signal information includes base station numbers and respective signal strength of the at least two base stations;
   obtaining the plurality of track records including the at least two base stations by searching the track record database according to the current signal information, wherein the track record database includes a plurality of track records, and each of the track records includes previous signal information and reference position information determined from a satellite positioning system; and
   calculating the current position information according to the track records and the current signal information.

9. An auxiliary positioning method, applied to a portable electronic device operative in a wireless communication network system and a satellite positioning system, for determining current position information of the portable electronic device, the auxiliary positioning method comprising steps of:
   generating current signal information from at least two base stations with the strongest two signal strengths as received at the portable electronic device, wherein the current signal information includes base station numbers and respective signal strength of the at least two base stations;
   receiving signals of the satellite positioning system and calculating a position information;

storing the position information and the current signal information into a track record in a track record database; and when it is no longer possible to receive signals of the satellite positioning system and determine a position information from the satellite positioning system, calculating the current position information according to the track records and the current signal information, wherein calculating the current position information comprises:

establishing a first reference position defined by an intersection point of an arc of a first circle having a first radius and a first line segment passing through a first known position and a second known position of the portable electronic device with respect to a first one of the at least two base stations;

establishing a second reference position defined by an intersection point of an arc of a second circle having a second radius and a second line segment passing through the second known position and a third known position of the portable electronic device with respect to a second one of the at least two base stations; and determining the current position based on an intersection between (1) a first tangent line tangent to the first circle and passing through the first reference position and (2) a second tangent line tangent to the second circle and passing through the second reference position.

10. An auxiliary positioning device, applied to a portable electronic device operative in a wireless communication network system and a satellite positioning system, for determining current position information of the portable electronic device, the auxiliary positioning device comprising:

a satellite positioning system module, for calculating position information according to the satellite signals from the satellite positioning system, and a signal processing module for generating signal information from at least two base stations with the strongest two signal strengths as received at the portable electronic device, wherein the signal information includes base station numbers and respective signal strength of the at least two base stations;

a track recording module, for storing the position information and the signal information into track records in a track record database when the portable device determines the position information from the satellite positioning system; and an auxiliary positioning module, coupled to the track recording module and the signal processing module, for calculating the current position information according to the track records and current signal information when the portable device can no longer determine the position information from the satellite positioning system, wherein the auxiliary positioning module is configured to calculate the current position information by:

establishing a first reference position defined by an intersection point of an arc of a first circle having a first radius and a first line segment passing through a first known position and a second known position of the portable electronic device with respect to a first one of the at least two base stations;

establishing a second reference position defined by an intersection point of an arc of a second circle having a second radius and a second line segment passing through the second known position and a third known position of the portable electronic device with respect to a second one of the at least two base stations; and determining the current position based on an intersection between (1) a first tangent line tangent to the first circle and passing through the first reference position and (2) a second tangent line tangent to the second circle and passing through the second reference position.

11. The auxiliary positioning device as claimed in claim 10, further comprising:

a wireless communication network system module, for receiving the signals from at least two base stations in the wireless communication network system; and a satellite positioning system module, for detecting whether there is a signal from the satellite positioning system to calculate position information, and receiving signals from the satellite positioning system and calculating position information when the signals from the satellite positioning system are received.

12. The auxiliary positioning device as claimed in claim 10, wherein the satellite positioning system is one of Global Positioning System (GPS), GLObal NAvigation Satellite System (GLONASS) and Galileo satellite positioning system (GALILEO).

13. The auxiliary positioning device as claimed in claim 10, wherein the position information at least comprises one of a longitude data, a latitude data, an altitude data, a speed data and a direction data.

14. The auxiliary positioning device as claimed in claim 10, wherein the wireless communication network system is one of Global System for Mobile communications (GSM), wireless fidelity (WiFi) communication network, Worldwide Interoperability for Microwave Access (WiMAX) communication network and a digital television (DTV) system.

15. The auxiliary positioning device as claimed in claim 10, wherein the portable electronic device is one of a portable navigation device (PND), a mobile phone and a portable computer.

* * * * *